UNITED STATES PATENT OFFICE.

JAMES F. McCORMIC, OF MARION, IOWA, ASSIGNOR OF ONE-HALF TO GILES R. MARTIN, OF SAME PLACE.

COMPOSITION FOR MARBLE OR STONE.

SPECIFICATION forming part of Letters Patent No. 339,569, dated April 6, 1886.

Application filed August 6, 1885. Serial No. 173,769. (No specimens.)

*To all whom it may concern:*

Be it known that I, JAMES F. McCORMIC, a citizen of the United States, residing at Marion, in the county of Linn and State of Iowa, have invented a certain new and useful Improvement in Compositions for Marble or Stone, of which the following is a specification.

My composition consists of the following ingredients, in about the proportions stated, viz: common quicklime, four pounds; marble-dust, ten pounds; plaster-of-paris, ten pounds; water lime or cement, two pounds; sulphur, two ounces; water in sufficient quantities to reduce the mixture to about the consistency of common mortar.

In preparing the composition I mix the ingredients in the following manner and order: The quicklime is first slacked in water, as for plastering purposes. To this I then add the marble-dust, mixing them thoroughly. I then make a cavity in the middle of the mass, and in this I mix thoroughly the plaster-of-paris and cement and the sulphur, which has been previously "cut" with alcohol. Enough water is added to admit of the materials being worked freely. This second mixture is then combined with the first, by stirring and working, until the whole mass is homogeneous, water being added, as required, to properly temper it. The composition is applied to walls as a plaster, or as a plastic material is molded into any desired form. When dry, it has most of the essential and practical qualities of marble, is not injuriously affected by heat or dampness, and has a fine crystalline appearance, very closely resembling the best grades of white marble.

The proportions stated above are approximate only, and may be varied considerably without essentially changing the character of the composition. For ordinary purposes, however, the formula stated will be found to give satisfactory results.

The marble-dust being the ingredient which gives to the composition the peculiarly marble-like appearance when hardened, its place may obviously be supplied with some other ingredient of an analogous character, to give the composition the appearance of other kinds of stone. Thus, for example, for outside work in buildings or otherwise, where a less brilliant effect is desirable, sand may be substituted for the marble-dust without materially changing the nature of the composition, except in this respect.

The purpose of the sulphur is to harden the composition, and its quality in this particular may be varied by using more or less of this ingredient. In practice I use the common pulverized sulphur.

The composition, as described above, is one that "sets" and hardens quite readily, but in general may be used without any modification. When, however, considerable time is desired in which to mold the plastic material into more or less elaborate forms, something to retard the hardening is necessary. This may be accomplished by the addition of a small quantity of common vinegar or molasses. Indeed, from experiments that I have made to this end, I conclude that anything sweet or sour will answer the purpose. So, also, the same effect may be produced by the use of common glue. The quantity of any one of these ingredients will be governed by the requirements of each case, and need not be definitely stated, as the judgment of the operator will be sufficient to supply the amount.

To give the composition the appearance of variegated or mottled marble, coloring-matter of one or more shades may be added to the mass while in a plastic state, and partially incorporated therewith by stirring with a few irregular strokes. To give it a solid color the coloring-matter is thoroughly mixed with the mass.

Having thus briefly described my invention, what I claim, and desire to secure by Letters Patent, is—

1. A composition for artificial marble or stone, consisting of lime, marble-dust, or sand or analogous substance, plaster-of-paris, cement, and sulphur, mixed together, with water enough to make the mass plastic, substantially as specified.

2. A composition for artificial marble or stone, consisting of lime, marble-dust, or sand or analogous substance, plaster-of-paris, cement, and sulphur, made plastic and thoroughly mixed in water, with coloring-matter partially or thoroughly mixed therewith, to give it a variegated or solid coloring, as described.

3. A composition for artificial marble or stone, consisting of lime, marble-dust, or sand or analogous material, plaster-of-paris, cement, sulphur, and water, with glue, vinegar, molasses, or equivalent substance adapted to retard the hardening of the mass, substantially as set forth.

In testimony whereof I affix my signature in presence of two witnesses.

JAMES F. McCORMIC.

Witnesses:
J. T. OXLEY,
M. B. ALLEN.